United States Patent [19]

Gustafson

[11] Patent Number: 4,621,262

[45] Date of Patent: Nov. 4, 1986

[54] METHOD OF AND A SYSTEM FOR REMOTE CONTROL OF ELECTRONIC EQUIPMENTS

[75] Inventor: Bengt G. Gustafson, Sigtuna, Sweden

[73] Assignee: U. S. Philips Corporation, New York, N.Y.

[21] Appl. No.: 582,425

[22] Filed: Feb. 22, 1984

[51] Int. Cl.⁴ .................... G08C 19/00; G10K 11/00; H04B 1/59; H04B 11/00

[52] U.S. Cl. .......................... 340/825.69; 340/825.72; 340/850; 367/197; 367/6; 367/133

[58] Field of Search ................ 455/33, 54, 49; 367/3, 367/5, 6, 133, 134, 197; 340/850, 851, 854, 855, 825.69, 825.72; 343/387, 388, 56 C; 180/167, 168

[56] References Cited

U.S. PATENT DOCUMENTS 3,641,575  2/1972  Auer, Jr. et al. .................... 367/197
4,396,918  8/1983  Wallis ................................ 343/388

*Primary Examiner*—Ulysses Weldon
*Assistant Examiner*—Ralph Smith
*Attorney, Agent, or Firm*—Thomas A. Briody; William J. Streeter; Leroy Eason

[57] ABSTRACT

A method of and a system for remote control of individual electronic equipments which are spread out across a large geographical area. Particularly activation of radio transmitters spread over the water surface and cooperating with hydrophones for picking up sound waves from submarines in order to locate submarines. To selectively activate the electronic equipments electromagnetic waves or sound waves are transmitted with given relative time positions from at least three fixed stations having known geographical positions. In each electronic equipment the waves are received and compared as regards their relative time positions at reception, activation of an equipment taking place only if a given criterion as regards said mutual time positions is fulfilled. Activation of equipments will take place only within a given small zone of said large area. The location of said small zone is determined by the relative time positions of the transmitted waves, which can be varied in order to select different zones.

8 Claims, 4 Drawing Figures

METHOD OF AND A SYSTEM FOR REMOTE CONTROL OF ELECTRONIC EQUIPMENTS

BACKGROUND OF THE INVENTION

Field of the Invention

The invention relates to a method for the remote control of a plurality of electronic equipments, which are spread out across a geographical area and are each provided with a receiver and a transmitter.

The invention can be utilized in the case of submarine reconnaissance, in which case the electronic equipments are listening devices having hydrophones submerged in the water and cooperating with radio transmitters for transmission of detected sound. By covering a large area with listening devices in this manner full information about possible sound sources will be obtained for enabling position determination. However, a problem is that the large number of listening devices makes it difficult to distinguish and evaluate the useful information. If the transmitters in all listening devices were active simultaneously they would disturb each other and at the same time waste energy. In order to be able to utilize the information in an optimal manner it is therefore desirable to activate the transmitters selectively and to control the selective activation to a geographically limited area, where the listening devices have useable information to deliver.

SUMMARY OF THE INVENTION

According to the invention this problem is solved thereby in that from at least three geographically spaced transmitter stations with known positions activation signals having given relative time positions are transmitted, which signals are received and compared as regards time by the same electronic equipments, activation of an equipment being effected only if a given criterium as regards the relative time positions of the received signals is fulfilled.

The invention is based upon the fact that the travel time for radio waves or possibly sound waves from the different stations will be different for different points within the large geographical area and by making predetermined conditions as regards the relative time position of the received signals, it is thus possible to activate an electronic equipment only under the provision that it is situated at a certain geographical spot or within a certain geographical area. The certain spot or the certain area, where activation takes place, can then be changed by varying the relative time position for the transmitted signals with maintenance of the activation criterium.

The activation signals can be pulse-shaped, in which case the relative time positions of the pulses transmitted from the different stations will be decisive for the area, where activation takes place. Alternatively the activation signals can be continuous with time indicating markings modulated thereon.

The invention relates also to a system for the remote control of a plurality of electric equipments. According to the invention such a system is characterized in that the invention is illustrated in accompanying drawings, in which

Figure 1:
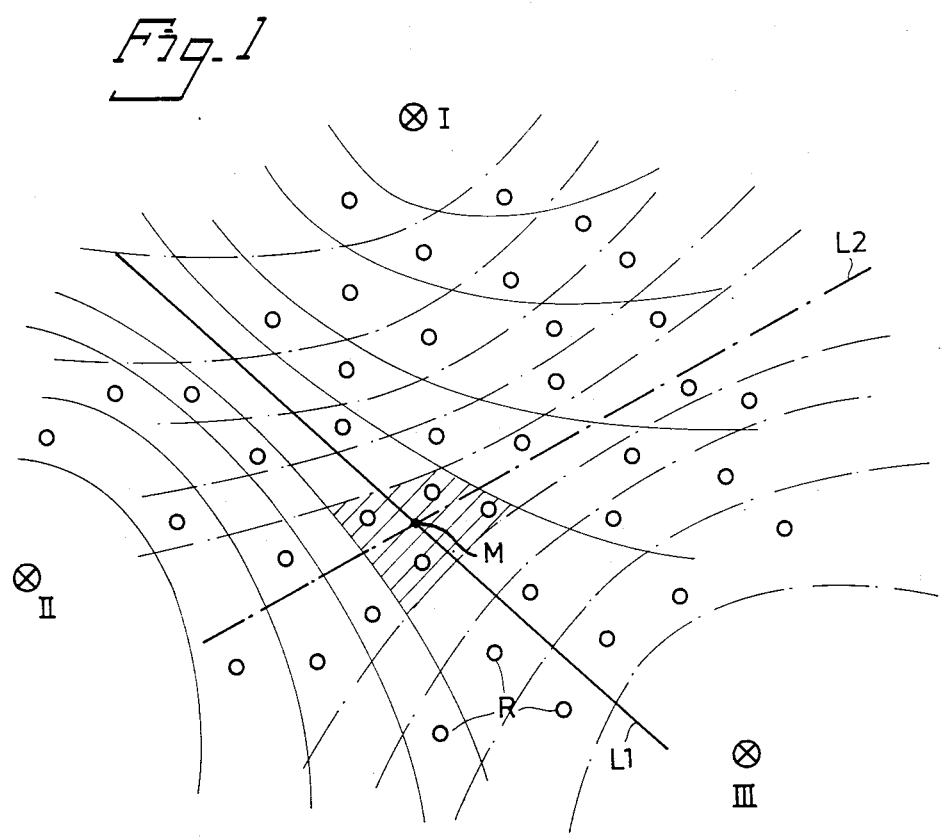
FIG. 1 is a diagram of a geographical area with a number of listening devices, i.e. of free floating radio buoys, and three fixed radio stations illustrating the set-up of the invention.

According to FIG. 1 a large number of identical radio buoys, designated R, have been spread across a sea area, where they are free-floating. From each buoy a hydrophone is submerged in the water in order to detect possible sound from objects in the water, such as submarines. The purpose is to localize the object and the buoys have therefore been spread in an area, where presence of an object in the water has been indicated. In the vicinity of the area comprising the floating buoys there are at least three fixed radio stations, designated I, II and III. The radio stations can be fixed or mobile land stations or situated on anchored ships. Each buoy has a transmitter for transmitting possible sound detected by the hydrophone on a radio carrier to the radio stations. The modulated carriers transmitted from the buoys are received in the radio stations, localization of the sound source being then effected by comparison of the signals from the different buoys.

The buoys are normally in a stand-by condition involving that the receiver part is active, while the transmitter part is inactive. According to the invention the buoys can be activated selectivaly within a limited geographical zone by transmission of electromagnetic signals from the radio stations I, II and III, which stations are therefore provided with transmitter means for transmission of activation signals. By varying the transmitted signals different zones can be selected. The selective activation is based upon the difference in travel time for the radio waves from the different radio stations to the buoys. In FIG. 1 therefore the loci for points at which there is a constant difference of travel time from the radio stations are shown in the shape of two hyperbola curve groups, the curve group drawn with full line being applicable to the radio stations I and II and the curve group drawn with dashed- and-dotted lines being applicable to the radio stations I and III. Each curve corresponds to one particular value of the difference in trave time.

In a first embodiment it is assumed that the activation signals consist of short, time displaced HF-pulses within the VHF or UHF band, the relative time position of the pulses being decisive for the point or the area, where activation of the buoy transmitters takes place. The time diagram for such a transmission is shown in FIG. 3 and a receiver adapted for such a transmission is shown in FIG. 2.

Figure 3:
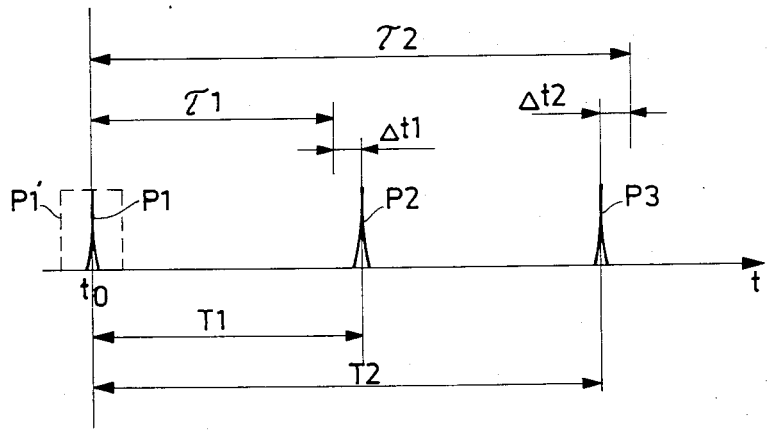
FIG. 3 shows a time diagram in order to explain the function of the receiver as shown in FIG. 2.

According to FIG. 3 the transmission consists therein that the station I transmits a short pulse P1 on a frequency within the VHF or UHF band at the time moment $t_O$. A time interval T1 later station II transmits a pulse P2 on the same frequency and a time interval T2 after $t_O$ the station III transmits a pulse P3 on the same frequency. Synchronization of the stations can be effected by transmission of sync pulses and simultaneously the time intervals T1 and T2 are set from a central control device.

Figure 2:
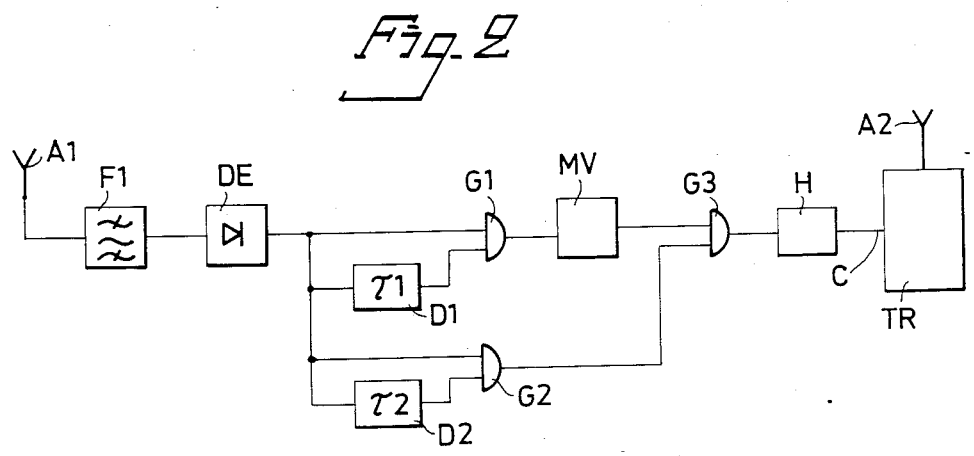
FIG. 2 shows the receiving part of a radio buoy in a first embodiment of the invention.

The receiver in each buoy consists according to FIG. 2 of an antenna A1 followed by a bandpass filter T1 tuned to the transmitter frequency and a detector DE. All signals received by the antenna A1 thus will appear in successive order in the shape of DC-pulses at the output of the detector DE. These pulses are led on the one hand directly to a first input of two AND-gates G1 and G2 and on the other hand to a second input on the same gates via a delay device D1 with the time delay τ1 and a delay D2 with the time delay τ2, respectively. The time delays, of which τ2 is larger than τ1, are so adapted to the mutual time distance between the transmitted pulses that always the first and the second pulses are compared and possibly coincide in the gate G1 and the first and the third pulse being compared and possibly coincide in the gate G2. Output pulse from the gate G1, if any, is led to a monostable flip-flop MV, serving as a temporary memory for the output pulse from gate G1, and will set this flip-flop. The flip-flop MV is connected to a first input of a third AND-gate G3, which at a second input receives the pulse from the gate G2, if any. Upon setting of the flip-flop MV the gate G3 will be opened and kept open until possibly a pulse from the gate G2 has arrived. The output signal from G3 is led to a holding circuit or timer H delivering a signal to an activation input C on the transmitter TR during a given time interval after a pulse from G3. In the case of a signal at the activation input C, the active components in the transmitter are connected to a voltage source, so that the transmitter starts to operate and transmits information via the antenna A2; in this example a carrier modulated with the sound signals, if any, is transmitted from the hydrophone.

The operation is as follows.

Assume first that the time interval T1 between the pulse P1 from the transmitter I and the pulse P2 from the transmitter II is exactly equal to the fixed time delay τ1 in the receiver part of the buoy stations. Coincidence in the gate G1 and consequently an output pulse from G1 then will be obtained only in those buoy stations which are situated exactly on the line L1 in FIG. 1. In these buoy stations the flip-flop MV is set and the gate G3 is prepared. In all remaining stations, which are not situated on the line L1, there will be no coincidence in the gae G1 and no setting of the flip-flop MV takes place. In corresponding manner, if the time interval T2 between the pulse P1 from the station I and the pulse P3 from the station III is axactly equal to the fixed delay τ2 then coincidence will appear in the gate G2 and an output pulse will be obtained from the gate G2 only in those stations which are situated exactly on the line L2 in FIG. 1. In all remaining stations there will be no coincidence and no output pulse from the gate G2. Because the condition for the gate G3 to deliver an output pulse for activating the transmitter TR via the holding circuit H is that both the gate G1 and the gate G2 deliver a output pulse, in this case with T1=τ1 and T2=τ2, only that buoy station will be activated which is situated in the cross point between the lines L1 and L2, i.e. in the point M in FIG. 1.

Now, if the interval T1 is varied so that it differs from the fixed τ1 then coincidence in the gate G1 will still appear in some of the radio buoys; but not, however in those stations which are situated on the line L1. If for example T1 is made smaller than τ1 then coincidence will appear in G1 in all radio buoys situated on a given hyperbola in the hyperbola group between the line L1 and the station I. If T1 is made larger than τ1 then coincidence in G1 will appear in radio buoys which are situated on a given hyperbola in the hyperbola group between the line L1 and the station II. In corresponding manner if T2 is made smaller than τ2 then coincidence will appear in the gate G2 in radio buoys situated on a hyperbola in the hyperbola group between the line L2 and the station I, whilst if T2 is made larger than τ2 coincidence will appear in radio buoys situated along a hyperbola group between the line L2 and the station III. The control magnitudes which are decisive for the point where coincidence appears in both G1 and G2, and consequently where activation of the transmitter of the radio buoy takes place, namely the deviations of the time intervals T1 and T2 from the fixed time delays τ1 and τ2 which control magnitudes in FIG. 3, are designated with Δ t1 and Δ t2, respectively. Theoretically with such short pulses only one single radio buoy situated in a predetermined point can be activated. Due to finite pulse width in reality a given area will fulfil the activation condition.

if it is desired that all radio buoys within a larger geographical zone shall be activated, this can easily be achieved by transmitting pulses of a given width instead of short pulses. If for example instead of the short pulse P1 in FIG. 3 the wide pulse P1' is transmitted, then in the given example with T1=τand T2=τ2 all radio buoys situated within dashed area in FIG. 1 will be activated. Thus by varying T1 and T2 each area can be selected for activation and the size of the area is determined by the pulse width.

Figure 4:
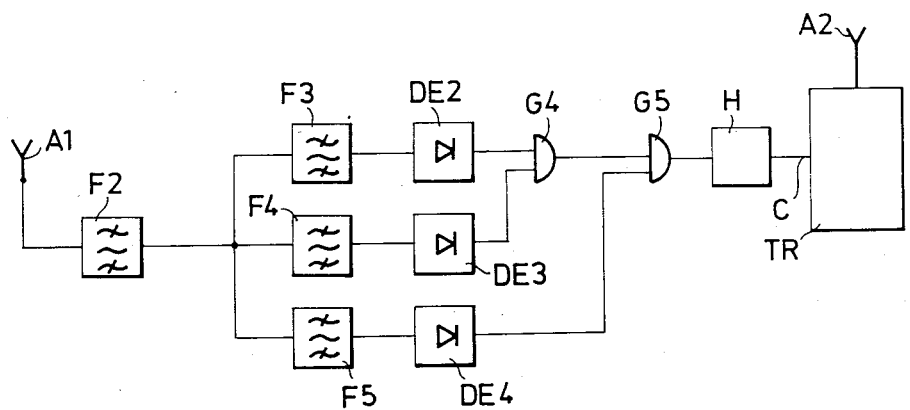
FIG. 4 shows the receiving part of a radio buoy in another embodiment of the invention.

In order to improve the disturbance resistance and to decrease the probability for unintentional activation, the activation signals from the radio stations can be alotted an individual character, for example are given a different frequency or are encoded in a special manner. A receiver for such a type of transmission is shown in FIG. 4. In this case it is assumed that the activation signals consist of continuous signals of a given frequency within the VHF or UHF band, which signals are modulated with pulses of a sub-carrier, the frequency of the subcarriers being individual for each station. Then the pulses do not need to be separated in time but can, in the described example, be transmitted simultaneously, if a radio buoy in the point M is activated.

The receiver consists according to FIG. 4 of a bandpass filter F2 tuned to the actual high frequency and followed by three bandpass filters F3, F4 and F5 tuned to the subcarrier frequencies of the different stations. After the filters there follows three detectors DE2, DE3 and DE4 and two AND-gates G4 and G5 arranged in cascade. The function is the same as that described in connection with FIG. 2.

Instead of distinguishing the transmissions of the different radio stations from each other by signals, which are separated in time or frequency, individual codes may be used and the signals may be pulse-shaped, intermittent or continuous.

In principle continuous waves without modulation can alternatively be used, in which case the mutual phase position between received waves from different stations will be decisive for activation or not of a buoy transmitter. In order to determine the geographical position of the area, where activation takes place, the mutual phase position of the transmitted waves is varied. Instead of radio waves it is alternatively possible to use sound waves in the water, in which case the radio stations are replaced by sound generators cooperating with submarine loudspeakers. The principle construction of the receivers of the buoy stations and the principle for activation will in this case be the same as described for electromagnetic waves.

What is claimed is:

1. A method for the remote control of a plurality of electronic equipments which are spread across a geographical area and which each include a receiver and a transmitter, comprising transmitting from at least three geographically separated stations with known positions, activation signals having selected relative time positions; which signals are received and the relative time positions thereof are compared by said electronic equipments; activation of any electronic equipment being effected only if a predetermined criterion as regards the relative time positions of the activation signals received by such electronic equipment is fulfilled; the relative time positions of the transmitted activation signals being the criterion determining the area in which activation of any of said electronic equipments takes place, and the durations of such signals being the criterion determining the size of such area.

2. A method as claimed in claim 1, wherein the activation signals are in the form of pulses.

3. A method as claimed in claim 1, wherein the activation signals are in the form of continuous carrier waves provided with time indicating modulations.

4. A method as claimed in claim 3 wherein the time indicating modulations are in different time positions from the different stations.

5. A method as claimed in claim 1, wherein the activation signals from the different stations have distinguishing characteristics other than their relative time positions, whereby the signals can be distinguished at the electronic equipments even when transmitted simultaneously.

6. A method as claimed in claim 5 wherein the activation signals are signals of different frequencies.

7. A system for the remote control of a plurality of electonic equipments spread across a geographical area, wherein each equipment comprises a radio transmitter and receiver; the system further comprises at least three geographically separated stations with known positions; each station is provided with activation signal generating means for the transmission of activation signals to the said equipments, the activation signals transmitted by the different stations having selectable relative time positions and durations; and each of the said equipments comprises means for receiving the activation signals, means for detecting predetermined relative time positions therebetween, and switching means responsive to detection of such predetermined relative time positions of said activation signals for controlling the activation of the transmitter comprised in said equipment; the relative time positions of the transmitted activation signals being the criterion determining the area in which activation of said electronic equipments takes place and the durations of the transmitted activation signals being the criterion determining the size of such area.

8. An equipment for use in a system as claimed in claim 7, comprising a radio transmitter, a radio receiver, means for receiving the activation signals, means for detecting predetermined relative time positions therebetween, and switching means which, upon reception by said receiver of activation signals having such predetermined relative time positions, controls the activation of the transmitter of the equipment.

* * * * *